US012645596B2

(12) United States Patent
Bhattacharya et al.

(10) Patent No.: US 12,645,596 B2
(45) Date of Patent: Jun. 2, 2026

(54) HARDWARE ASSISTED PAGE MIGRATION IN A MULTI-DIELET PROCESSING SYSTEM

(71) Applicant: NVIDIA Corporation, Santa Clara, CA (US)

(72) Inventors: Debajit Bhattacharya, San Jose, CA (US); Ashish Kumar Maurya, Santa Clara, CA (US); Anthony Sauvageau, King, NC (US); Timothy Ian Milne, New Hill, NC (US); Vaishali Kulkarni, Sunnyvale, CA (US); Yi Su, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/607,525

(22) Filed: Mar. 17, 2024

(65) Prior Publication Data

US 2025/0291730 A1    Sep. 18, 2025

(51) Int. Cl.
*G06F 12/0831* (2016.01)
*G06F 12/0882* (2016.01)

(52) U.S. Cl.
CPC ...... *G06F 12/0833* (2013.01); *G06F 12/0882* (2013.01)

(58) Field of Classification Search
CPC .......................... G06F 12/0833; G06F 12/0882
See application file for complete search history.

(56) References Cited

U.S. PATENT DOCUMENTS

| | | | |
|---|---|---|---|
| 11,132,326 B1 | 9/2021 | Modukuri et al. | |
| 11,182,309 B2 | 11/2021 | Feehrer et al. | |
| 11,741,015 B2 | 8/2023 | Duluk, Jr. et al. | |
| 11,789,649 B2 | 10/2023 | Chatterjee et al. | |
| 2014/0089585 A1* | 3/2014 | Nakajima ............. | G06F 3/0604 711/E12.017 |
| 2014/0123146 A1 | 5/2014 | Barrow-Williams et al. | |
| 2014/0281297 A1 | 9/2014 | Duluk, Jr. et al. | |
| 2014/0281299 A1 | 9/2014 | Duluk, Jr. et al. | |
| 2014/0281323 A1 | 9/2014 | Duluk, Jr. | |
| 2014/0281324 A1 | 9/2014 | Duluk, Jr. et al. | |
| 2014/0281358 A1 | 9/2014 | Duluk, Jr. et al. | |
| 2015/0082001 A1 | 3/2015 | Duncan et al. | |
| 2015/0199126 A1 | 7/2015 | Jayasena et al. | |
| 2015/0206277 A1 | 7/2015 | Rao et al. | |

(Continued)

OTHER PUBLICATIONS https://docs.nvidia.com/cuda/cuda-runtime-api/group_CUDART_MEMORY.html, Mar. 2024.

(Continued)

*Primary Examiner* — Aracelis Ruiz
(74) *Attorney, Agent, or Firm* — Nixon & Vanderhye P.C.

(57) ABSTRACT

A hardware mechanism at each dielet of a multi-dielet processing system is aware of engine page-table binds at all the dielets, thereby providing accurate traffic notifications to software (e.g., a unified virtual memory driver) for on-demand page-migration between system memory and GPU memory. The mechanism broadcasts binding information to access counters on each dielet so the access counters are able to correlate engines requesting memory access with bound virtual memory pages and generate corresponding informative notifications. A flexible multi-dielet counter clear capability enables software to clear access counters.

19 Claims, 14 Drawing Sheets

2.5D Inter-dielet Routing

(56) References Cited

U.S. PATENT DOCUMENTS

| | | | | |
|---|---|---|---|---|
| 2021/0081325 A1* | 3/2021 | Bradshaw | ............. | G06F 3/0649 |
| 2021/0081326 A1* | 3/2021 | Curewitz | ........... | G06F 12/0284 |

OTHER PUBLICATIONS

Appleyard, "Pascal and Cuda 8.0" NVIDIA (Jul. 2016).
T. Zheng et al, "Towards high performance paged memory for GPUs," 2016 IEEE International Symposium on High Performance Computer Architecture (HPCA), Barcelona, Spain, 2016, pp. 345-357, doi: 10.1109/HPCA.2016.7446077.
Li et al., "A Framework for Memory Oversubscription Management in Graphics Processing Units", ASPLOS'19, Apr. 13-17, 2019.
Garg et al., developer.nvidia.com/blog/improving-gpu-memory-oversubscription-performance/, Oct. 5, 2021.
Arunkumar et al., MCM-GPU: Multi-Chip-Module GPUs for Continued Performance Scalability, International Symposium on Computer Architecture (ISCA) (ACM 2017), research.nvidia.com/publication/2017-06_mcm-gpu-multi-chip-module-gpus-continued-performance-scalability, /doi.org/http://dx.doi.org/10.1145/3079856.3080231.
"TSMC's New Wafer-on-Wafer Process to Empower NVIDIA and AMD GPU Designs," engineeering.com (May 3, 2018), engineering.com/story/tsmcs-new-wafer-on-wafer-process-to-empower-nvidia-and-amd-gpu-designs.

* cited by examiner

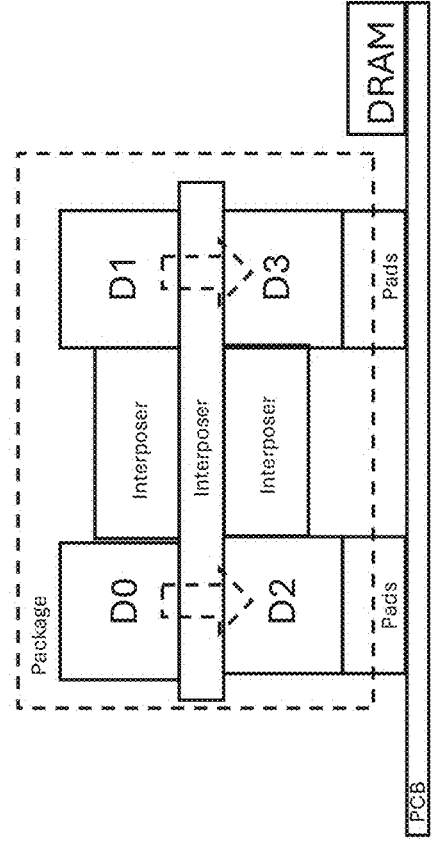
FIG. 4B: 3.5D Inter-dielet Routing
FIG. 4A: 2.5D Inter-dielet Routing

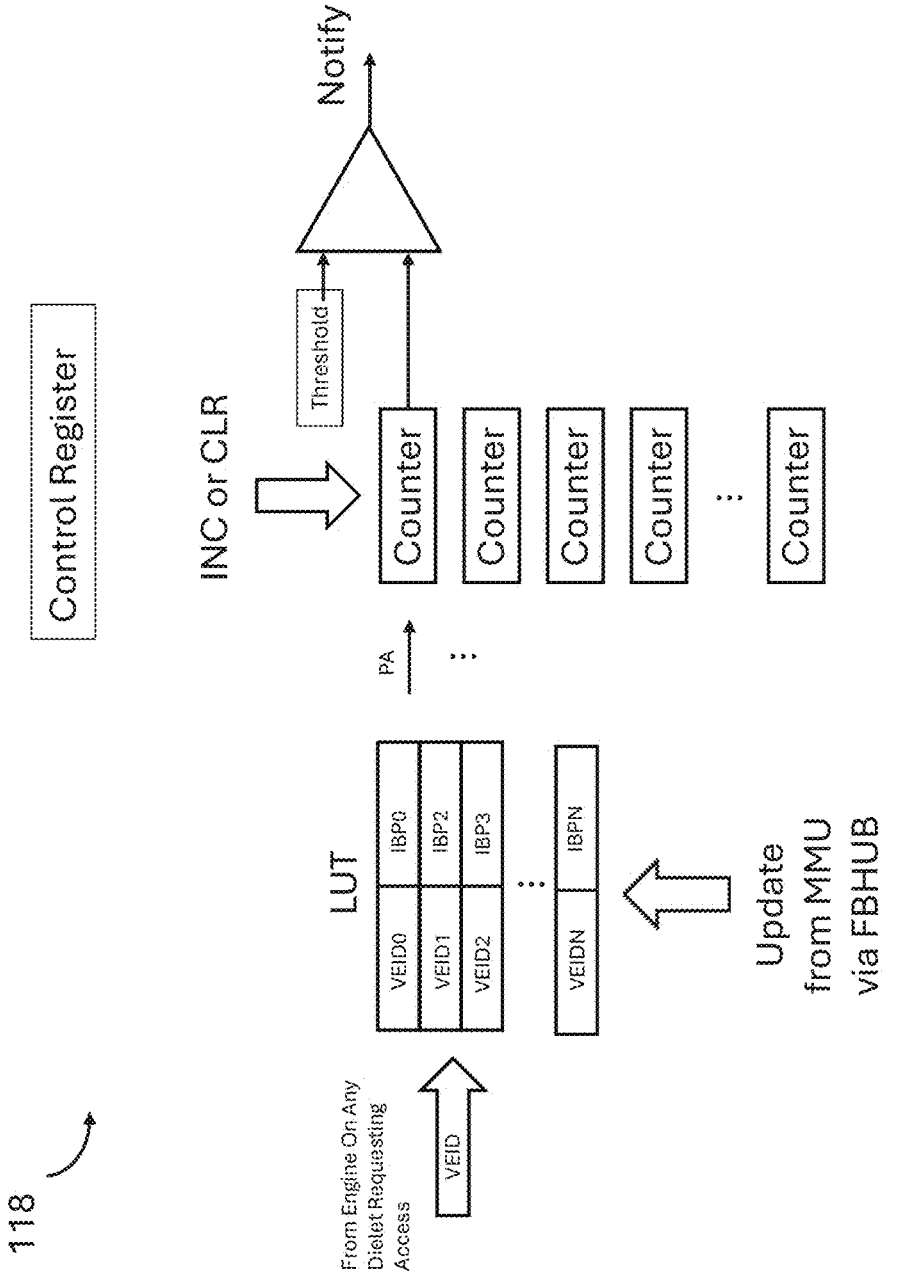
FIG. 7 Access Counter Circuit

FIG. 8 Bind Flow

HARDWARE ASSISTED PAGE MIGRATION IN A MULTI-DIELET PROCESSING SYSTEM

CROSS-REFERENCE TO RELATED APPLICATIONS

This application is related commonly-assigned copending patent application No. 63/566,359 entitled "Synchronizing Memory Management Units in Multi-Dielet Processor Architectures" filed on date even herewith (23-SC-01018US01/6610-169), which is incorporated herein by reference for all purposes as if expressly set forth. This copending application is referred to herein as "Synchronizing MMUs".

FIELD

Embodiments relate to hardware-assisted migration of memory pages in a multi-dielet processing system such as a processing system including a multi-chip module (MCM) graphics processing unit (GPU).

BACKGROUND

As FIG. 1 shows, multiprocessor systems typically include a processor such as a CPU 14 with a system memory 12 that stores data and instructions in memory pages 18. The processing system may further include one or more auxiliary processors 100 such as for example GPUs (graphics processing units). In the case of the auxiliary processor being a GPU 100, the applications the auxiliary processor performs can be graphics applications including for example a texture-based graphics pipelined process—and more recently, ray tracing and compute applications including but not limited to tensor operations and deep neural networks.

In one scenario shown in FIG. 1A, the CPU 14 may generate or otherwise provide instructions and data directed to an auxiliary processor 100 and arrange for such data and instructions to be stored in a dual ported system memory 12. The CPU/SOC 14 may then direct the auxiliary processor 100 to execute the applications from the dual-ported system memory 12. The auxiliary processor 100 will retrieve the instructions and data from dual-ported system memory 12, perform the operations indicated by the instructions, and store resulting data back to system memory 12. The CPU 14 may then retrieve the resulting data from the system memory 12.

As FIG. 1A shows, a problem with this approach is that the pathways the auxiliary processor 100 uses to access the instructions and data in system memory 12 may be a bottleneck. Each access may take many cycles to complete, which slows down the auxiliary processor 100. Some of the high latency can be hidden using techniques such as local caching by the auxiliary processor 100, but as auxiliary processors 100 have become faster with higher throughput, the high latency shown in FIG. 1A became unacceptable.

FIG. 1B shows an improvement where the auxiliary processor 100 is now able to access instructions and data from a local memory 16 such as video memory. This is a little like your elementary school children being able to go to school at a new school built locally to your home instead of traveling to the school across town. Before the auxiliary processor 100 starts processing work, the CPU 14 copies the instructions and data for the work from system memory 12 to video memory 14 local to the auxiliary processor. The auxiliary processor 100 can now fetch instructions and retrieve data from relatively low latency local memory 16 instead of from relatively high latency system memory 12. However, such copying takes time, so that execution of the instructions by the auxiliary processor 100 is typically delayed until at least some of the memory pages 18 that included the needed instructions and data are copied from the system memory 12 to the local memory 16 of the auxiliary processor 100.

About a decade ago, NVIDIA addressed this problem by introducing Unified Memory ("UM") (see FIG. 1C) that allows a single pointer for both CPU functions and GPU kernels. This allowed the auxiliary processor 100 and the CPU/SOC 14 to directly access each of system memory 12 and video memory 16 (i.e., all system memories were mapped into a common, unified address space). NVIDIA's CUDA 8 and Pascal architecture further significantly improved Unified Memory functionality by adding on-demand page migration that freed developers from having to write applications that managed data movement between the CPU/SOC 14 and video memory 16. For example, the CUDA "cudaMallocManaged" API call allocates memory the Unified Memory system will automatically manage. See e.g., docs.nvidia.com/cuda/cuda-runtime-api/group_CU-DART_MEMORY.html; US20150206277; U.S. Pat. Nos. 11,182,309; 11,132,326; Appleyard, "PASCAL AND CUDA 8.0" NVIDIA (July 2016)-

FIGS. 2A and 2B illustrate how the Unified Memory Architecture is able to automatically service page faults on an empty GPU and an oversubscribed GPU, respectively. At oversubscription, a memory page is first evicted from GPU memory to system memory, followed by transfer of requested memory from CPU to GPU. None of this needs to be managed by the application—hardware and driver software takes care of it automatically. For example, when a GPU 100 kernel working set exceeds the GPU physical memory capacity, i.e., when the GPU memory becomes "oversubscribed", pages are automatically swapped in and out of GPU memory on demand. A Page Migration engine allows GPU threads to fault on non-resident memory accesses so the system can automatically migrate pages from anywhere in the system to the GPU's local memory on-demand for efficient processing. Whenever a particular GPU touched data managed by Unified Memory, this data could automatically be migrated to local memory of the GPU or the software driver could establish a direct access over the available interconnect (e.g., PCIe or NVLINK).

Many applications have benefitted from such GPU memory oversubscription and page migration capabilities. Imagine for example a ray tracing engine that shoots a ray which can bounce off in any direction depending on material surface. If the entire scene does not fit in GPU memory (which is often the case given the size of a typical ray tracing acceleration data structure), the ray may easily hit a surface that is not available and has to be fetched from system memory. In this case, computing what pages should be migrated to GPU memory at what time is almost impossible to determine since directions the ray may take are unpredictable. True GPU page fault capabilities of the Pascal architecture provide on-demand page migration from system memory into GPU local memory. Not only can the GPU's Unified Virtual Memory (UVM) driver migrate pages from SOC/CPU (system memory) to a GPU's video memory, it can also migrate pages from a peer GPU's video memory ("peermem") to the GPU's local video memory.

The UVM driver uses several heuristic based algorithms to monitor and efficiently manage page-migrations. Within the page migration engine there is an access counter circuit—a module or circuit in the GPU hardware—that can track and count the GPU processor core accesses to memory remote to the GPU (e.g., system memory, peer memory) on a granularity that is programmable by software. Usually, the granularity corresponds to the default page-size for the GPU's video memory. When the number of accesses of a remote page reaches a certain threshold (programmable by software) indicating the GPU has touched the page more than a certain number of times, the access counter module notifies (via a notification buffer) the UVM driver with binding information (aperture, Guest Virtual Address, Instance-Block-Pointer, etc.) to uniquely identify the surface. This is done via the hardware performing a write to the notification buffer in a driver-accessible pre-allocated memory range and at the same time sending an interrupt to the driver. It is then up to the UVM driver to decide based on performance improvement heuristics whether to migrate the page to the GPU's local memory so the GPU can continue to access the page but now at lower latency. The UVM driver takes conventional steps to validate and ensure coherency if/when it does migrate the page.

For more information on the mechanics of page migration in such a system, see for example US20150082001; U.S. Pat. Nos. 11,741,015; 11,789,649; US20140281358; US20140281297; US 20140281299; US20140281323; US20140281324; T. Zheng et al, "Towards high performance paged memory for GPUs," 2016 IEEE International Symposium on High Performance Computer Architecture (HPCA), Barcelona, Spain, 2016, pp. 345-357, doi: 10.1109/HPCA.2016.7446077. For additional background on GPU memory oversubscription, see e.g., Li et al, "A Framework for Memory Oversubscription Management in Graphics Processing Units", ASPLOS'19, Apr. 13-17, 2019; developer.nvidia.com/blog/improving-gpu-memory-oversubscription-performance/.

Until now, there has been a single access counter circuit or module and associated "notify buffer" as described above for each GPU—with notifications generated from different I/Os sharing the same space in the notify buffer. But recently, some in the semiconductor industry have proposed to compose each GPU "chip" out of multiple chip modules ("MCM")—i.e., package-level integration of multiple dielet modules to build larger logical processing systems that can enable continuous performance scaling beyond Moore's law. For example, it has been proposed to partition GPUs into easily manufacturable more basic GPU Modules ("GPMs") each on its own dielet, and integrate multiple dielets on package using high bandwidth, power efficient signaling technologies. See for example Arunkumar et al, MCM-GPU: Multi-Chip-Module GPUs for Continued Performance Scalability, International Symposium on Computer Architecture (ISCA) (ACM 2017), research.nvidia.com/publication/2017-06_mcm-gpu-multi-chip-module-gpus-continued-performance-scalability, /doi.org/http://dx.doi.org/10.1145/3079856.3080231; "TSMC's New Wafer-on-Wafer Process to Empower NVIDIA and AMD GPU Designs," engineeering.com (May 3, 2018), engineering.com/story/tsmcs-new-wafer-on-wafer-process-to-empower-nvidia-and-amd-gpu-designs.

Such an approach such as shown in prior art FIGS. 3A & 3B for an example graphics processing unit ("GPU") implements the MCM-GPU as a collection of GPMs that share resources and are presented to software and programmers as a single monolithic (meaning single dielet), integrated unitary high performance processing system. The multi-chip modules may be either replicated (identical) or specialized depending on the demands of custom functionality, process technology, area, and/or power requirements. The multi-chip modules are connected together by wires in a common integrated circuit package (e.g., by stacking in one implementation see FIGS. 4A, 4B) to operate together as a unitary overall processing system. Such an approach can enable resource sharing of underutilized structures within a single processing system and eliminate hardware replication that would otherwise be needed if each dielet contained its own fully independent processing system.

There are challenges to coordinating operations between different multi-chip modules to continue to provide hardware support for page migration in a multi-dielet GPU.

BRIEF DESCRIPTION OF THE DRAWINGS

FIGS. 4A, 4B show example non-limiting MCM packaging.

FIG. 7 shows an example non-limiting memory access counter circuit.

FIG. 8 shows an example non-limiting bind flow diagram.

DETAILED DESCRIPTION OF NON-LIMITING EMBODIMENTS

Example embodiments make it possible to provide a unified view of page migration when a circuit such as an access counter circuit (used to track and count GPU processor core accesses to memory remote to the GPU) and associated notify mechanism is instanced or has occurrences on or across multiple dielets.

In particular, the access counter module described above is tightly coupled with the GPU's I/Os. In one example dual-dielet GPU configuration, the primary dielet has the PCIe+NVLink ports and the secondary dielet has the C2C ports. Each dielet has an access counter module that can track the GPU processor core accesses going out of the I/Os of that dielet. In example embodiments, each access counter module is allocated its own notify buffer (memory space to write the notifications).

However, in a different dual-dielet configuration (with or without MIG mode enabled), the GPU processor engines/cores from any dielet (MIG) are allowed to access I/Os in the same or different dielet. Unless each access counter module is updated with information related to an I/O access by a GPU processor core (for example, Instance-Block-Pointer (IBP) of the graphics page-table bind corresponding to the absolute Virtual Engine ID carried by the GPU processor core access), the access counter module is unable to correctly generate the notifications to software. Note: the acronym "MIG" should not be confused with "migration" but instead stands for something completely different, namely: "Multi-Instance GPU". See description and more detail near the end of this specification. Additionally, the term "engine" herein can include processing cores, clusters of processing cores, or any other unit or functional block that accesses memory in order to perform work.

Example embodiments herein accordingly provide hardware implementations that allow for multi-dielet coherency of engine page-table bind status, virtual engine identifier (VEID) information, and other instance block and page table data to allow any dielet's access counter circuit to accumulate accesses and send accurate notifications to software to suggest and implement page migrations. Example non-limiting embodiments also provide hardware mechanisms to orchestrate CLEAR operations of the counters (one or all) among multiple dielets.

Example Implementation

Figure 1A:
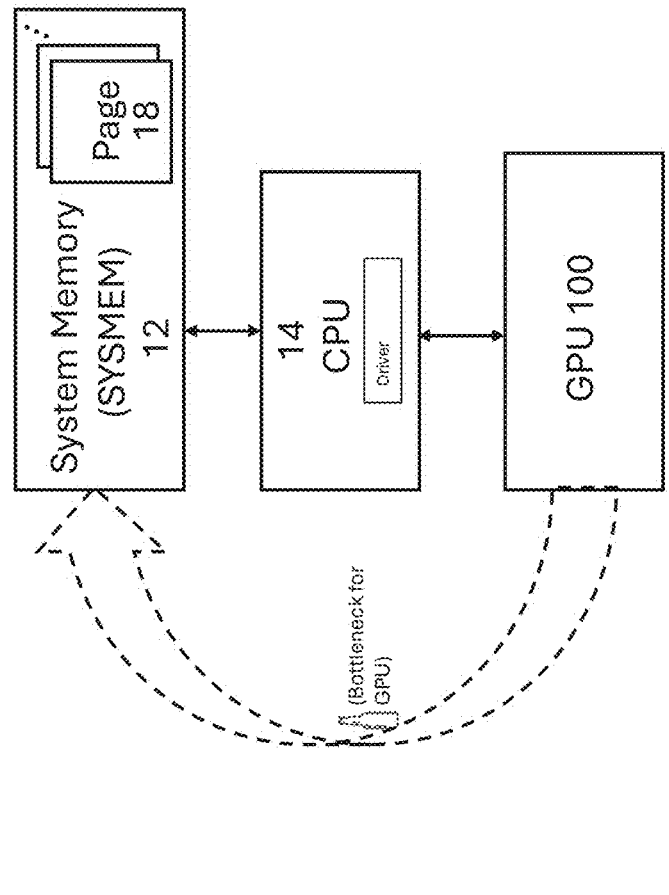
FIGS. 1A, 1B, 1C show example prior art system architectures including a CPU and an auxiliary processor such as a GPU.
Figure 1B:
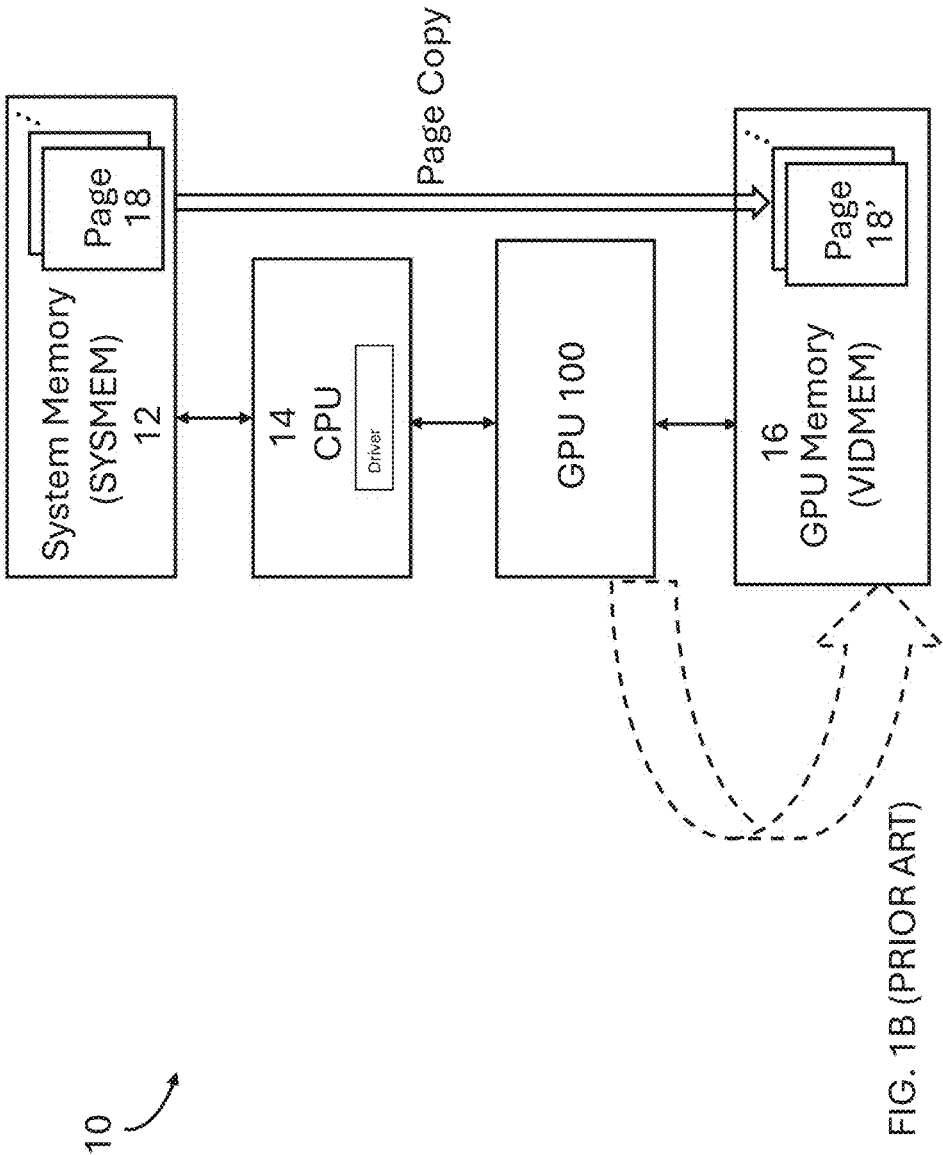
Figure 1C:
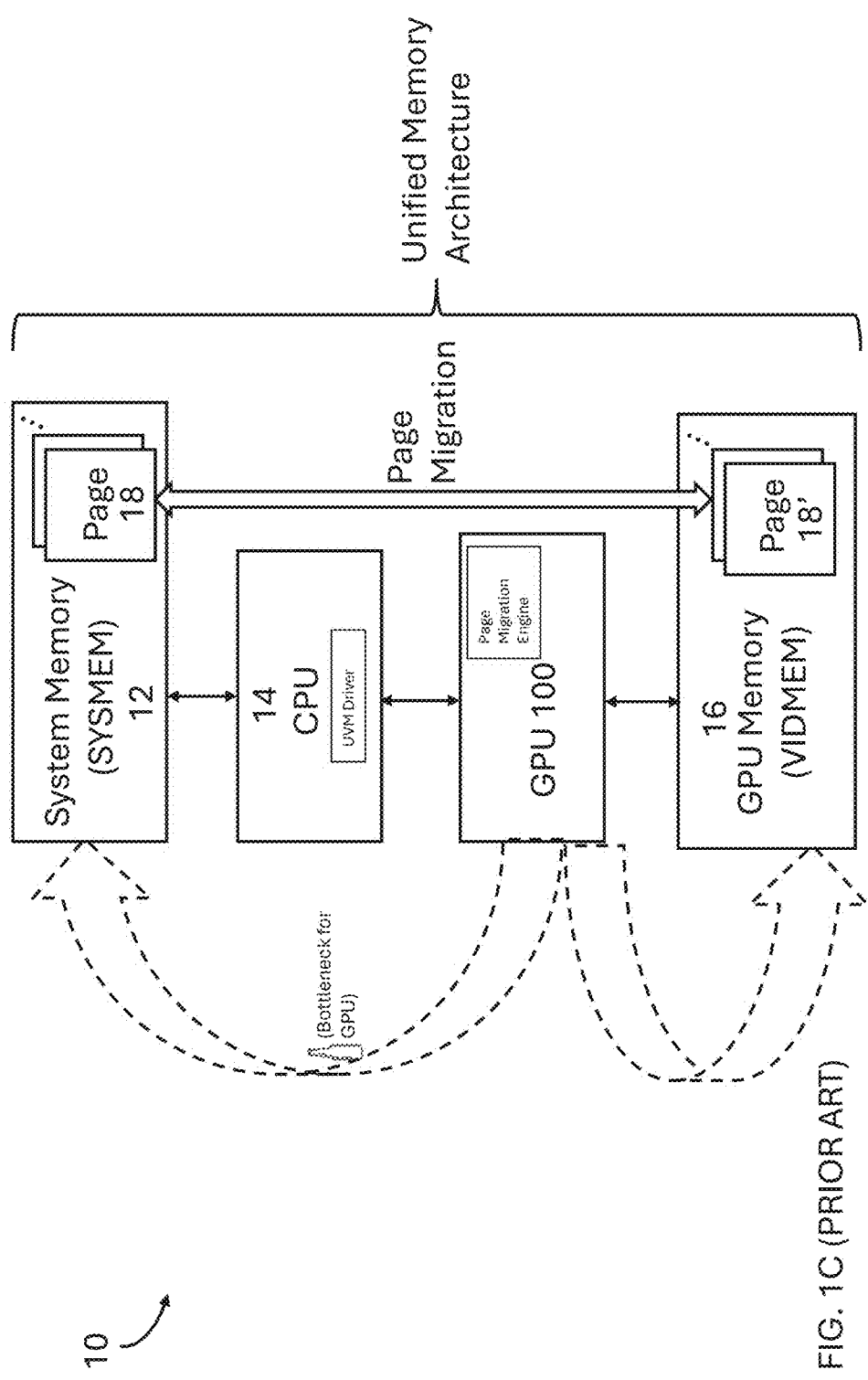
Figures 2A, 2B:
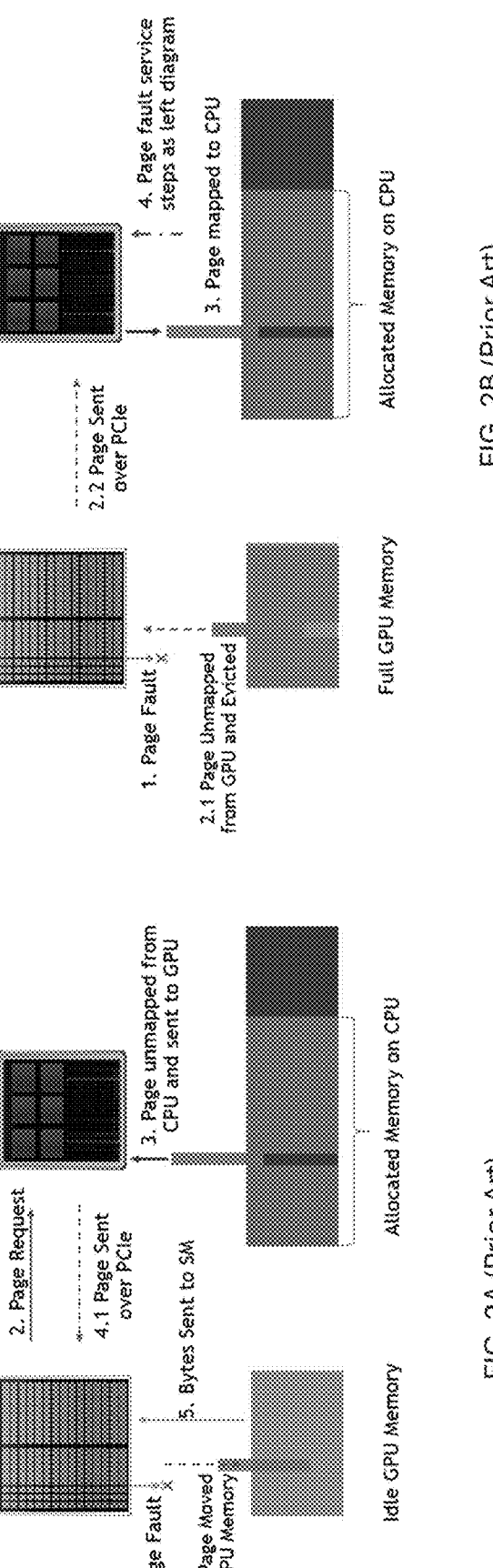
FIGS. 2A, 2B show prior art example migration of pages between system memory and GPU memory.
Figure 3A:
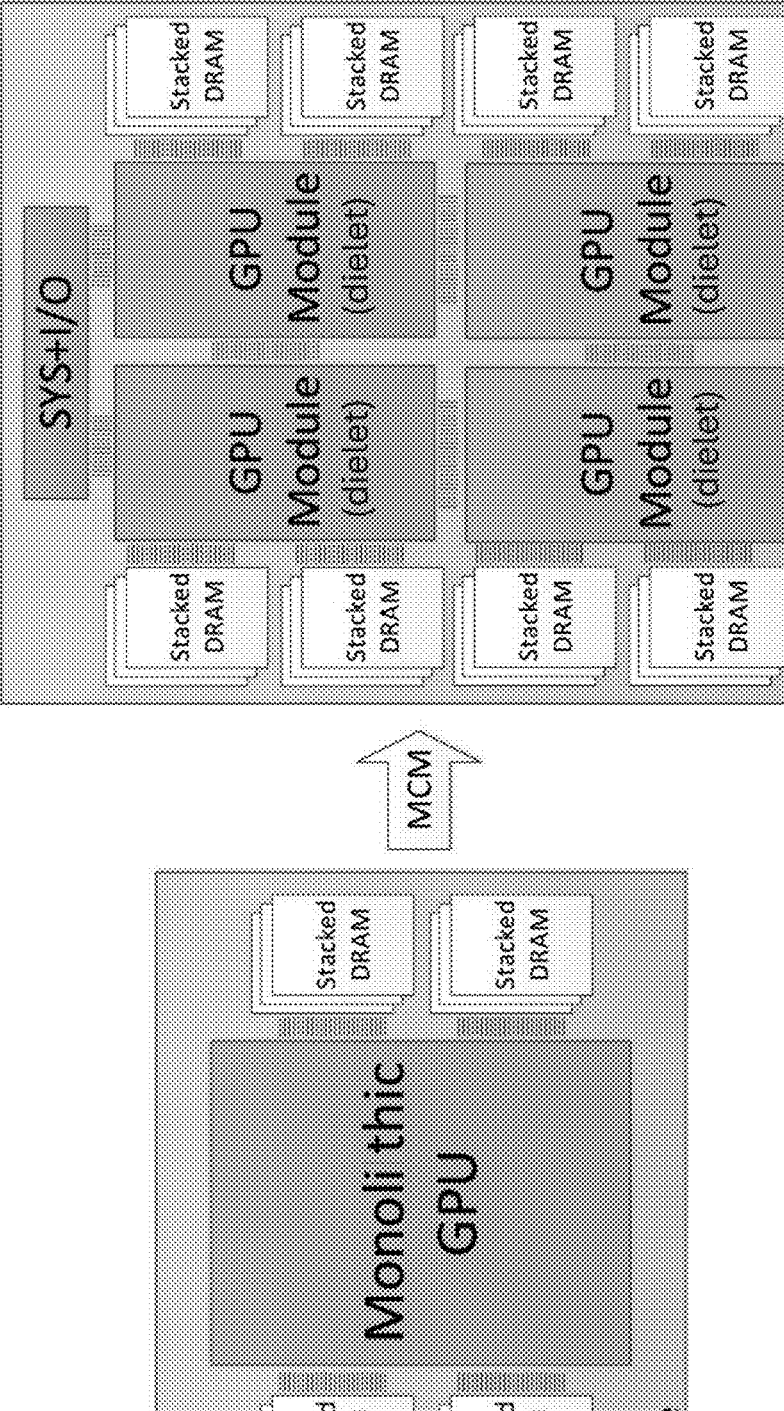
FIG. 3A shows an example multi-chip module (MCM) GPU.
Figure 3B:
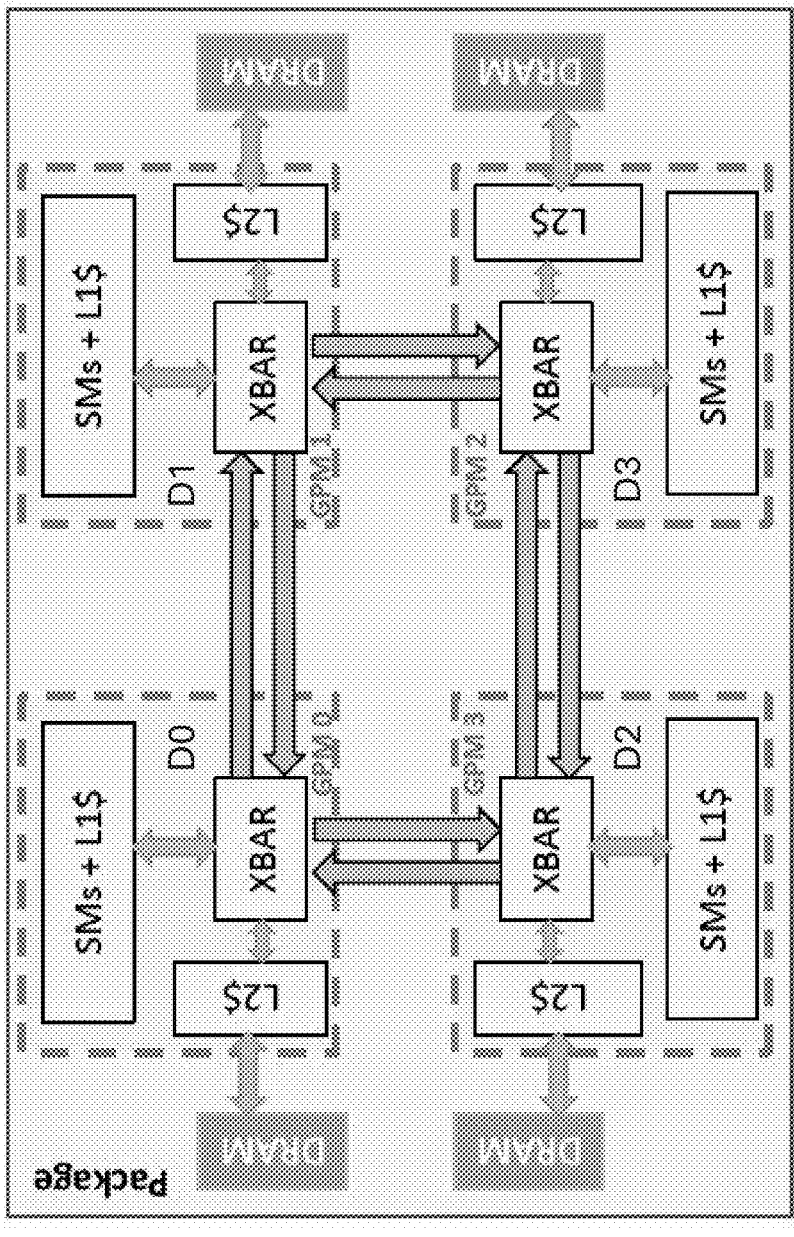
FIG. 3B shows an example internal high level block diagram of a multi-chip module GPU.
Figure 5:
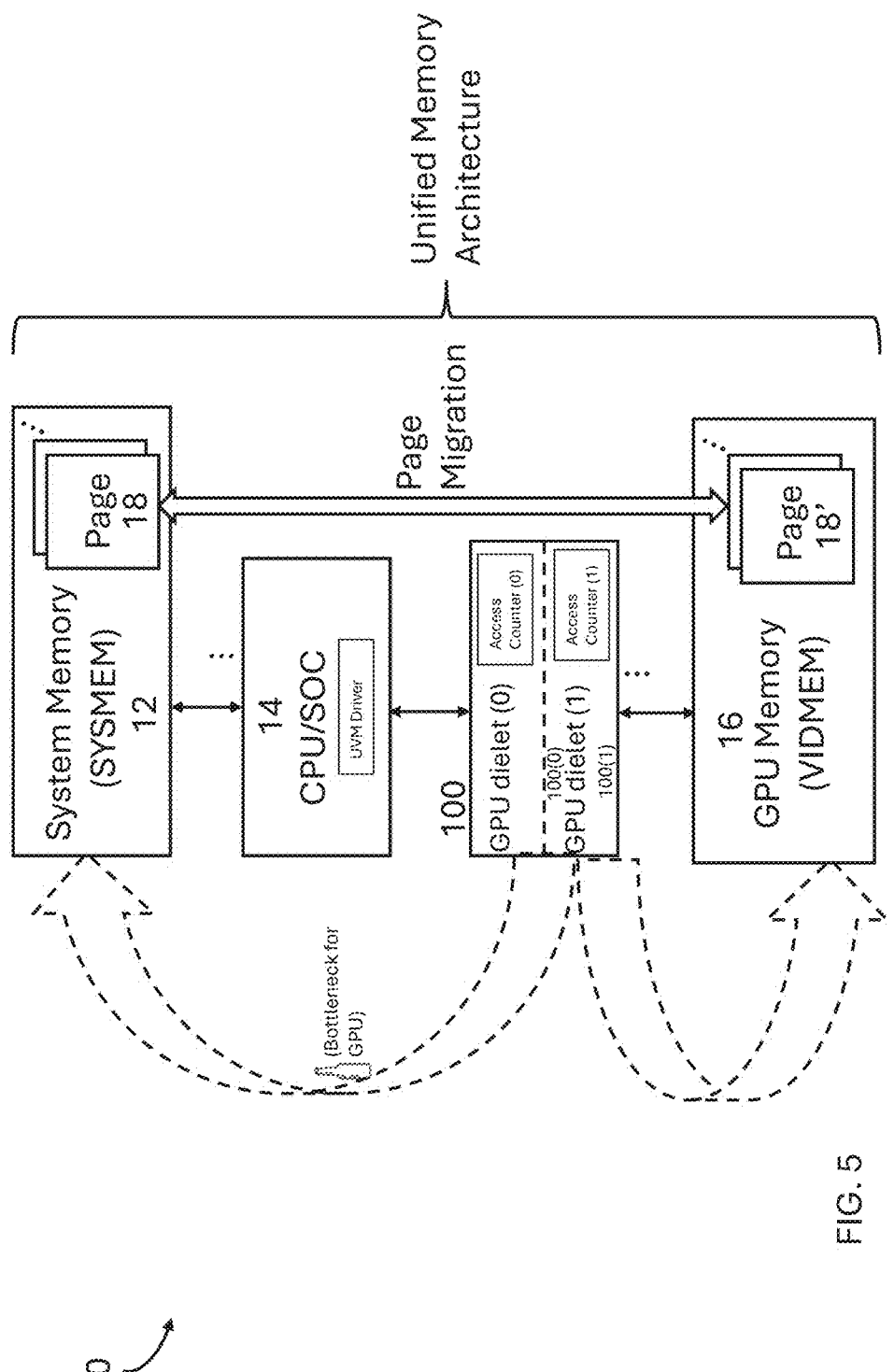
FIG. 5 shows a high level diagram showing page migration within a computing system including a MCM multi-dielet GPU.
Figure 5A:
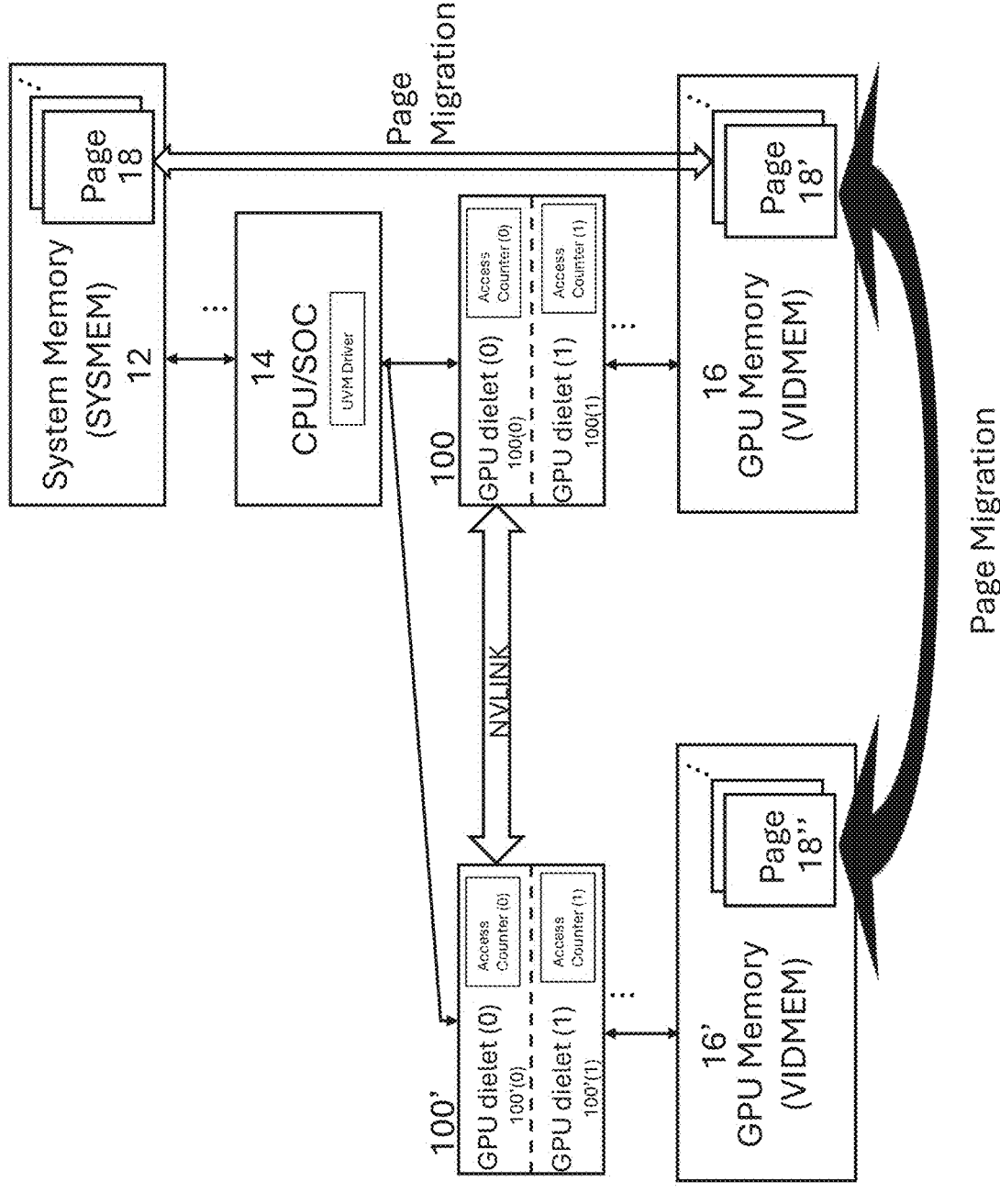
FIG. 5A shows a high level diagram showing page migration within a computing system including two or more MCM multi-dielet GPUs.

FIG. 5 shows an example block diagram of a computing system 50 including a multi-dielet GPU 100 including a first dielet 100(0) and a second dielet 100(1). FIG. 5A shows a further example embodiment of a computing system 50' with plural multi-dielet GPUs 100, 100', each dielet of which has an access counter circuit, to enable page migration e.g., between system memory and video memory and also between respective GPU video memories 16, 16'. In the examples shown, each of dielets 100(0), 100(1) has an access counter circuit that monitors and logs memory accesses. These access counter circuits are each responsible for generating the notifications described above. But in general, the access counter circuit on one dielet needs to know what the other dielet(s) is/are doing in terms of "memory bindings" (i.e., mappings between graphics or compute engines and shared memory address space) to generate such notifications.

Figure 6:
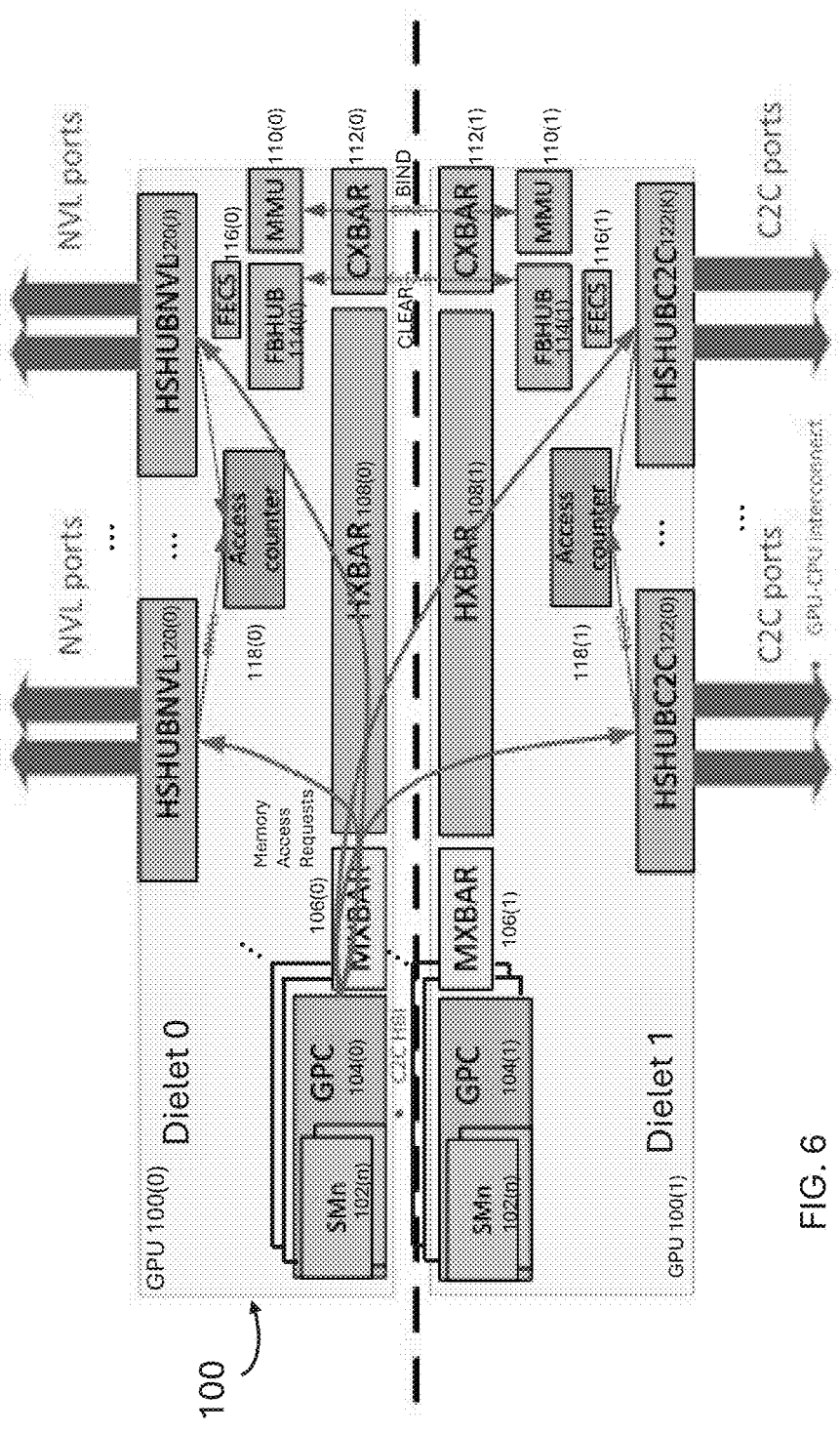
FIG. 6 shows a block diagram of a high level MCM multi-dielet GPU architecture including memory access request and data routing between dielets.

FIG. 6 shows a more detailed view. In the example shown, each dielet 100(0), 100(1) includes plural GPC 104 clusters each comprising a plurality of processing engines/cores 102 (e.g., streaming multiprocessors in one particular example). These GPCs 104 are what executes work—namely threadblocks that are part of an GPU software application. The work can be graphics or compute and can do any number of tasks such as image generation, ray tracing, object collision testing, machine learning such as deep or other neural networks, matrix or tensor calculations, or any number of other applications.

GPCs 104 access memory external of the GPU 100 via memory crossbars (MXBARs) 106. The GPC 104 or constituent processor cores may be assigned an identifier such as a VEID (virtual engine identifier) for use in accessing memory. As FIG. 6 shows, MXBARs 106 communicate via hub crossbars (HXBARs) 108 with respective high speed hubs 120, 122. These high speed hubs 120, 122 in turn connect to external input/output ports. In this example, dielet 100(0) has active HSHUBNVL hubs 120(0), 120(J) that connect to respective NVLINK I/O ports, and dielet 100(1) has active HSHUBC2C hubs 122(0), 122(K) that connect to respective C2C (chip to chip) I/O ports. Through these I/O ports, the GPCs 104 can access memory such as system memory, "peer" memory such as video memory attached to the peer GPU, etc.

Figure 6A:
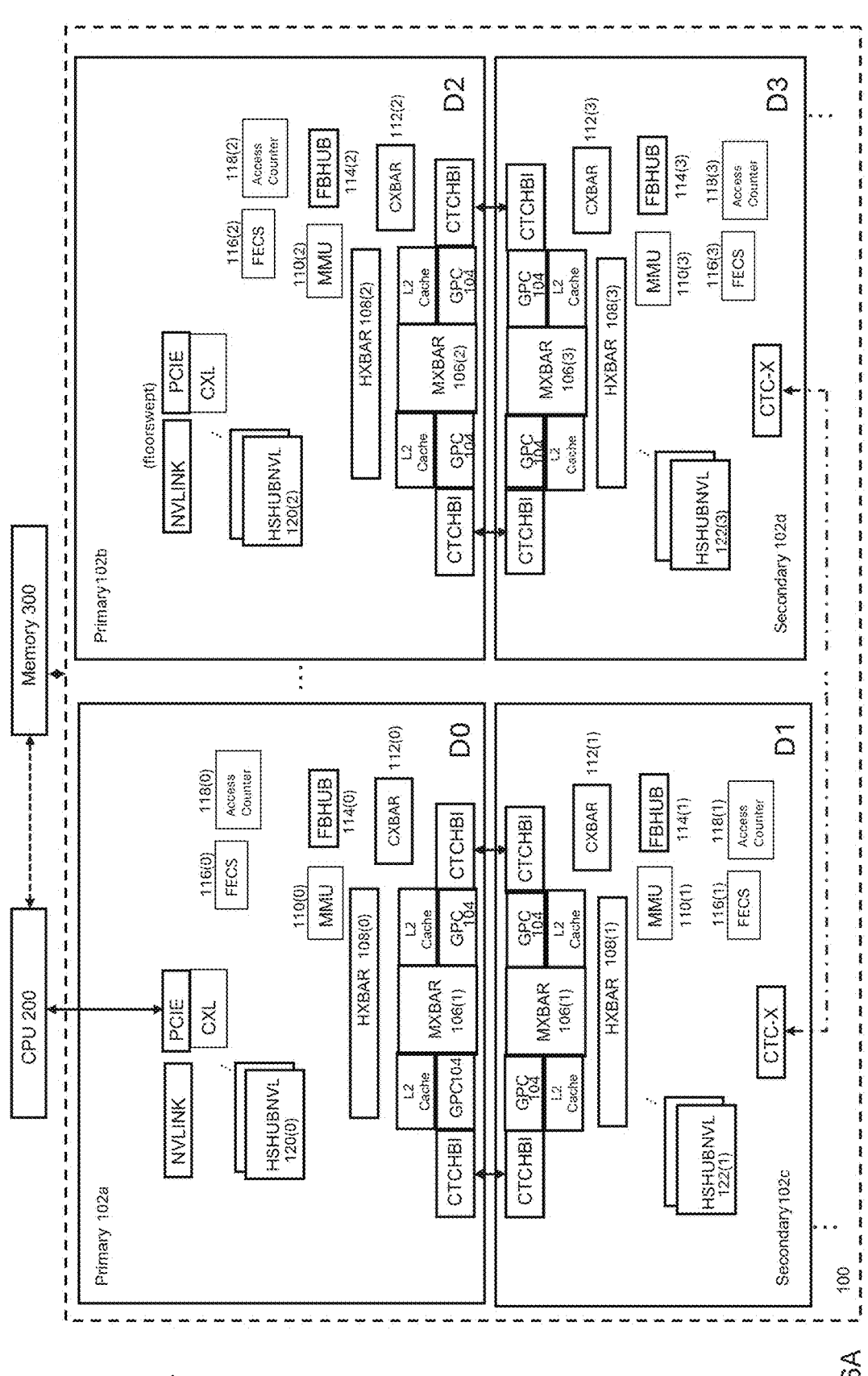
FIG. 6A shows a block diagram of a high-level MCM multi-dielet-GPU architecture with four dielets in the same package.

In one embodiment, the two dielets 100(0), 100(1) are structured identically so they each have on-chip HSHUBC2C and HSHUBNVL hubs. FIG. 6 shows only a subset of these hubs because in one embodiments one or the other of these hubs may be inactive on a given dielet as shown. In the FIG. 6 configuration shown, by virtue of routing access requests between the dielets via the C2CHBI interconnect, GPCs 104 and engines on either (any) dielet can access memory via the NVL ports on dielet 100(0) and GPCs and engines on either (any) dielet can access memory via the C2C ports. In other words, in this embodiment, an engine on either dielet can access memory via an I/O port of either (any) dielet. See for example Synchronizing MMUs. FIG. 6A shows a further embodiment comprising four dielets in the same package, with the four dielets not necessarily being identical (in this example, the top two dielets are the same, the bottom two dielets are the same, but the top and bottom dielets are not the same).

FIGS. 6 & 6A also shows access counter circuits or modules 118 as described above. In this example, each dielet 100(0), 100(1) has an access counter circuit or module. Thus, there is an access counter circuit or module 118(0) disposed on dielet 100(0), and an access counter circuit or module 118(1) disposed on dielet 100(1). In example embodiments, each dielet has exactly one access counter circuit or module 118 that tracks external memory accesses via the I/O ports of the dielet the counter circuit is in/on.

In the two-dielet example shown in FIG. 6, the two access counter circuits or modules 118(0), 118(1) may be instances of the same access counter circuit or module. In example embodiments, as shown in FIG. 7, the access counter circuit 118 comprises a bank of any number of counters. Each time the hub on a dielet accesses remote memory via its hub, the respective access counter circuit 118 on that dielet increments one of its counters that corresponds to the (programmable-size) page/block of memory containing the memory address of the remote access. When a counter reaches a certain (programmable) threshold indicating that dielet has accessed that memory block/page a certain number of times, the access counter circuit 118 generates a notification. In example embodiments, the software driver does not need (or want) to be notified by the hardware every time the GPU accesses any page in remote memory, but is instead notified when the GPU accesses a particular memory page more than a certain number (programmable) of times so the software driver can consider whether to migrate that page to GPU local memory. In this case, the software driver is making a heuristic determination that the GPU is likely to access the same page often in future that the GPU has accessed many times in the past. This is a little like a customer receiving a discount award card from a coffee shop upon purchasing a certain number of cups of coffee, making it more efficient for that customer to get the same coffee from the same shop in future.

In example embodiments, the access counter circuit 118 on each dielet operates independently of other access counter circuits on each other dielet. For example, in the embodiment shown, access counter circuit 118(0) on dielet 100(0) is informed about every memory binding and access via the NVL ports through dielet 100(0) but does not know details of memory bindings and accesses the other dielet makes via the other dielet's C2C ports. Similarly, access counter circuit 118(1) on dielet 100(1) is informed about every binding and access via that dielet's C2C ports but does not know details about accesses dielet 100(0) makes via the NVL ports on that other dielet. However, all accesses across both dielets 100(0), 100(1) are logged and counted by one or the other (i.e., the combination of) the two access counter circuits 118(0), 118(1) working independently but in tandem. In example embodiments, accesses tracked by access counter circuit 118(0) are thus not being tracked by access counter circuit 118(1) and vice versa.

Binding Information Passed to Access Counter Circuits

Thus, in example embodiments, every I/O link memory access a GPU dielet 100 initiates will cause a write of pertinent information into the access counter circuit 118 on that dielet. An internal on-dielet link on dielet 100(0) between HSHUBNVL 120 and the access counter circuit 118(0) provides certain information to the access counter circuit 118 for each access over the NVL ports:

Virtual Address (VA).

a PA value used to index counters within the access counter circuit 118

VEID (virtual engine identifier)

GFID etc.

Similarly, an internal on-dielet link between HSHUBC2C 122 and the access counter circuit 118(1) on dielet 100(1) provides the same type of information to the access counter circuit for each access over the C2C ports.

Memory Management Units and Bind Operations

Referring again to FIG. 6, a number of additional GPU components used to support virtual memory access and binding are also shown. First among these are memory management units (MMUs) 110. Each dielet has an MMU 110 which is used, among other things, to manage virtual memory in a way that hides memory latency. Also shown is a Front end context switch (FECS) 116 that configures MMU 110 to provide proper virtual address to physical address mapping. Generally, execution of a given GPU context waits until all page tables associated with the GPU context are configured by FECS 116. Once the FECS 116 generates a "done" signal to indicate that page table and related configuration steps are complete, a scheduler or work distributor (not shown) within the GPU may begin scheduling tasks associated with the page table. FECS 116 associates each page table with an address space identifier (ASID) via a bind command transmitted to MMU 110. Each thread block in turn is associated with an ASID, which is appended to each virtual memory request generated by the thread block during the course of execution. See e.g., US20140123146

An additional communications path called "FBHUB" (frame buffer hub) 114 is also available via an additional inter-dielet crossbar CXBAR 112 to communication message packets between dielets 100(0), 100(1). For example, an access counter circuit 118 may write via FBHUB to a memory buffer at a software-specified memory address. As noted, a C2C HBI (chip to chip high bandwidth interface) between the dielets 100(0), 100(1) passes data back and forth between the dielets.

In example embodiments, the MMU 110(0) on one dielet 100(0) communicates with other MMU(s) 110(1) residing on other dielets in the multi-dielet GPU via this C2C HBI interface (see vertical "BIND" arrow in the righthand side of FIG. 6). Communication may include information with respect to memory requests, memory responses, bind requests and responses, TLB invalidation requests and responses, and various acknowledgments, fault reporting, ATS requests and responses, ATS descriptor (ATSD) invalidations, video memory access bits (VAB), dump requests, etc. In some embodiments, these communications may proceed to the other dielets via the FBHUB 114. More details concerning the bind process may be found in Synchronizing MMUs.

In example embodiments herein, when MMU 100 returns the bind ack(nowledge), it provides the absolute VEID as well as the relative VEID from the original bind request. This new acknowledge method allows each dielet's FBHUB to be symmetrical in its handling of the graphics binds. This symmetry provides additional benefit as we scale the MCM designs to contain more dielets than just two.

In example embodiments, the bind table referenced above is a data structure storing information about the association between virtual memory regions and physical memory frames allocated to different engines/processes running on the GPU. Each entry in the bind table may include: the range of virtual addresses used by a process, the starting address of the physical memory frame allocated for the corresponding virtual address range, and access permissions (read, write, execute) associated with the memory region for protection.

A page table bind cache (PDB cache) is a hardware cache located in the (each) MMU 110. It may store recently used translations between virtual and physical addresses, aiming to improve performance by reducing the need to access the main page tables stored in memory for every memory access. When a program tries to access data using a virtual address, the MMU 110 first checks the page table bind cache. If the translation (mapping between virtual and physical address) for that specific address is found in the cache, the MMU 110 can efficiently translate the address and grant access to the corresponding physical memory location. This avoids the need to access the main page tables (which are typically slower to access than the cache), reducing memory access latency and improving overall performance.

The bind table and/or the PDB cache in the MMU 110 can be accessed by a hub translation lookaside buffer (TLB) or a process accessing the TLB and resulting in a TLB miss. The TLBs may have their TLB entries updated with entries provided by the MMU 110 as a result of looking up the bind table or PDB cache lookup, or a page table walk.

As noted above, upon creating a new binding, an Instance-Block-Pointer (IBP) establishes a correspondence with the absolute Virtual Engine ID carried by the GPU processor core that initiated the bind request. The IBP is stored in a graphics page-table to represent the graphics bind and thus corresponds to the GPC 104 (and in some embodiments, the engine/processor core 102) that binds with a memory page being accessed for the duration of the binding. The MMU 110 has this knowledge (i.e., for all MIG partitions), but the access counter circuit 118 also needs to know which engine and corresponding IBP has binded with which memory page it is counting accesses for. This is because the access counter circuit 118 is what serves up and delivers this context information to the software driver in the form of a notification for purposes of on-demand page migration. In example embodiments, the access counter circuit 118 writes to the notification buffer context (a) information from the bind process and (b) accesses by the processor core(s) 102.

Each Access Counter Circuit is Made Aware of Each Bind Across Multiple Dielets To provide the above, example non-limiting embodiments provide a hardware mechanism that makes the independent access counter circuit 118 (at each dielet) aware of the engine page-table binds at all the dielets, thereby providing accurate notifications to software (UVM driver) for page-migration in a multi-dielet configuration. This is accomplished by each MMU 110 on each dielet broadcasting certain bind information to all other MMUs on all other dielets (or in the FIG. 6 two-dielet example, MMU's 110(0) broadcasts bind information to MMU 110(1) and vice versa). Once acknowledgements to the broadcasts have been received, the bind information now possessed by MMU 110 on each dielet is used to update the access counter circuit 118 on the local dielet. In this way, each access counter circuit 118 on each dielet is continually synchronized to each bind on any dielet as that bind occurs. Then, when any engine on any dielet initiates a further memory access, the access counter circuit 118 on the dielet through which the access is made will recognize the VEID associated with the engine's memory access request and can correlate it with other information (e.g., the IBP) from the bind table the access counter circuit stores in a lookup table (LUT).

In legacy GPUs, since the software needs the IBP along with the GPU virtual address (GVA) for processing a notification, the access counter module or circuit 118 maintains a look up table (LUT) for VEID to IBP mapping. With MIG, the access counter circuit needs to report the MIG-relative VEID in the notification to software, although it still needs to maintain the LUT based on absolute VEID. For more information concerning MIG, please refer to information below.

In example embodiments, on a graphics bind, the access counter circuit 118 gets the required info from the MMU 110 to populate its LUT (see FIG. 7). In a multi-dielet configuration, since the graphics binds can happen from any dielet independently of the others, example non-limiting embodiments provide a mechanism to make the same VEID-IBP LUT information available to each of the access counter modules or circuits 118 on all dielets and keep them consistent.

Figure 8:
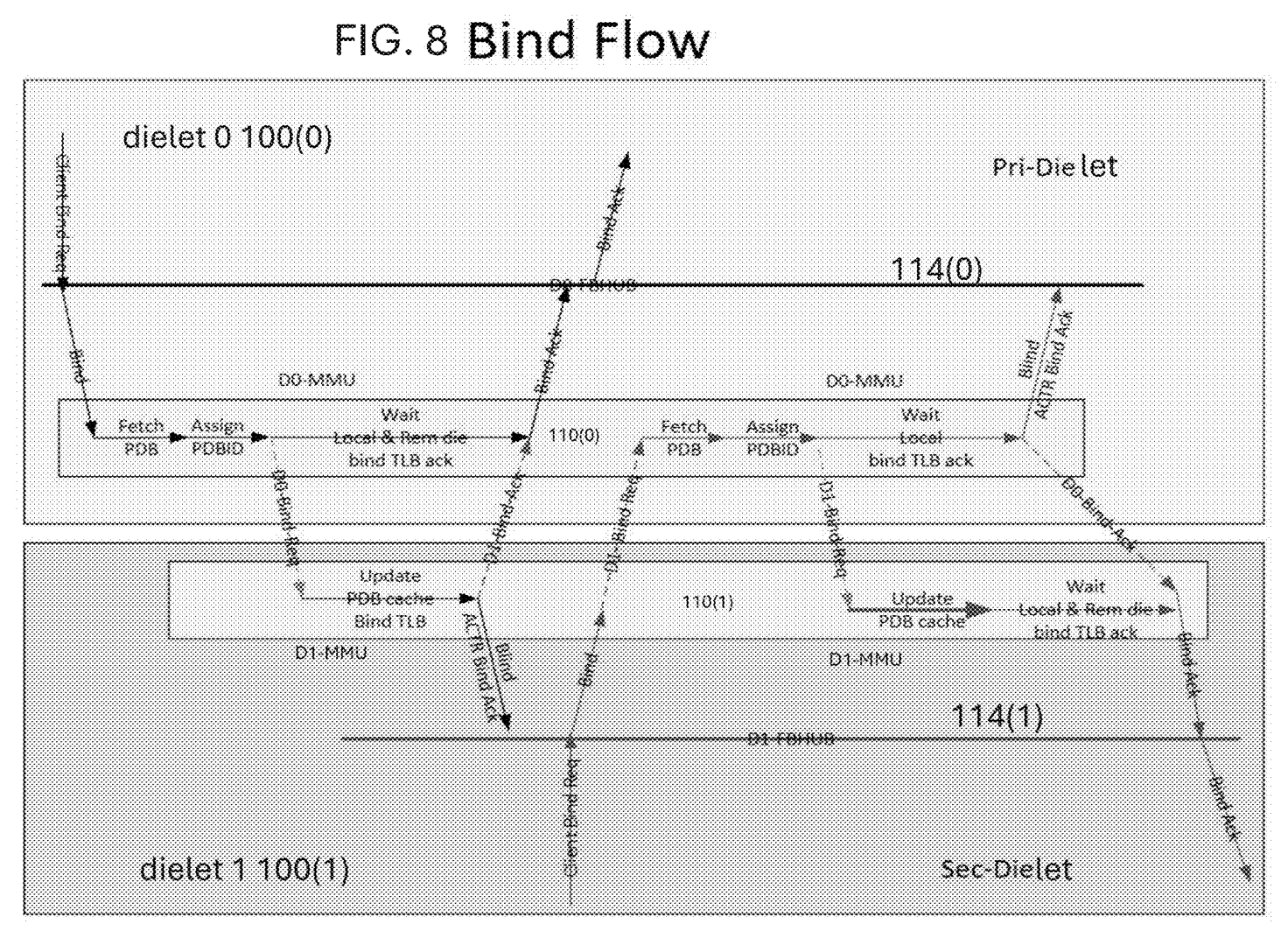

In particular, as shown in FIG. 8, when any graphics bind happens from Die X (e.g., dielet 100(0)), example embodiments ensure that the Die Y's (e.g., dielet 100(1)) access counter circuit (e.g., 118(1)) is updated with the bind info before updating the LUT in Die X (Y represents all the other dielets). In this mechanism, the MMU 110 broadcasts the bind information to all the dielets via the dedicated dielet2dielet interconnect(s) C2C HBI. The MMU 110 also ensures that Die Y's access counter circuit's LUT is updated prior to sending bind ack to Die X. In this example, Die Y receives a bind-ack(nowledge) for a bind that was not initiated by itself, and it need not forward the bind-ack (nowledge) to a client. A new identifier bit or other indicator in the bind-ack differentiates this special bind-ack from the regular bind-ack (when Die Y was the bind-initiator).

Example: Bind Flow

In prior designs, FBHUB 114 used the following sequence to prepare bind related fields in the access counter circuit 118's notification message:

1. FECS send bind request to FBHUB with SMC (processor core) relative veid, IBP, aperture and subid1
2. FBHUB forward FECS bind to MMU with subid2
3. FBHUB cache bind info (veid+ibp+aperture) is stored in local CAM1. The key is subid2
4. MMU returns bind ack/nack with subid2 and absolute veid 5. FBHUB checks bind ack and lookups local CAM1 with subid2, moves the bind info to CAM2. The key is absolute veid
6. FBHUB returns bind ack to FECS with subid1
7. ACTRS/ACTRSCTC receives updates with absolute veid
8. ACTRS generates GVA notification to FBHUB with absolute veid
9. FBHUB looks up local CAM2 with absolute veid and fills engine id, aperture and instance block pointer in final notification message.

In example embodiments herein, FECS 116 can send the bind to the local dielet, but remote access can be forwarded to a remote dielet. In that case, the ACTRS module in the remote dielet generates a notification to the remote FBHUB 114. The remote FBHUB 114 doesn't have the corresponding bind info.

Example embodiments can use an existing interface (mmuhubtlb2hub) to pass bind info from MMU 110 to FBHUB 114 in the remote dielet. Other embodiments could use new or different paths to carry this information from MMU 100 to FBHUB 114. In example embodiments, MMU 110 reformats existing bind ack packets to return the bind info (remote dielet) or bind ack (local dielet) with the following fields:

--- subid/not used in remote bind info case
absolute engine id (same as the existing VEID engine id in bind ack)
resp (bind ack/nack)
relative engine id (new from local bind request)
IBP instance block pointer (new from local bind request)
aperture (new from local bind request)
flag for remote bind info or local bind ack (new).

---

In example embodiments, FBHUB 114 monitors the new bind ack packet to update an internal bind table. The bind_ack packet is used to update the internal bind table to cache information based on the originating dielet's FECS bind request FIG. 8 shows an example multi-dielet bind flow in a case where dielet 0 is the primary dielet and dielet 1 is the secondary dielet. On each die, a client can send bind requests. For dielet 0, the bind request will go through the dielet 0 MMU 110(0). This will cause the MMU 110(0) to broadcast the bind request ("D0 Bind Req.") to a remote die, in this case MMU 110(1) on dielet 1. The remote dielet 1 then forwards a Bind ACTR Bind Ack to the remote dielet's FBHUB 114(1). At the same time, the remote dielet's MMU 110(1) sends a D1 bind ack message to the originating dielet's MMU 110(0) which passes the ack back to the D0 FBHUB 114(0) as usual. The part that is new is dual dielet interaction including passing the D0 Bind Request to 100(1) and generating the Bind ACTR Bind Ack on 100(1) for the remote dielet to apply to its FBHUB 114(1). in example embodiments, the flow is symmetrical for a client bind request coming into dielet 100(1), resulting in the generation of a Bind ACTR Bind Ack on the other dielet D0's FBHUB 114(0).

For example, suppose a client is using the primary dielet 100(0) for a bind request. The client's bind request goes to the primary dielet's MMU 110(0). The primary dielet's MMU 110(0) forwards the request to the remote dielet's MMU 110(1) via the inter-dielet chip-to-chip interconnect. The remote dielet's MMU 110(1) forwards the bind information to the remote dielet's FBHUB 114(1) which communicates the bind information to the remote dielet's access counter circuit 118(1). Once the access counter circuit 118(1) has received the update (to avoid a race), the remote dielet's MMU 110(1) provides an acknowledgement to the primary dielet's MMU 110(0). The primary dielet MMU 110(0) will then send a bind acknowledgement to the primary dielet's FBHUB 114(0). The primary dielet's access counter circuit 118(0) will receive the same bind information through the bind acknowledgement the primary dielet's MMU 110(0) sent to the primary dielet's FBHUB 114(0). In this way, the access counter circuits 118(0), 118(1) on each dielet receive the bind information. While this example illustrates a system where there is a single primary dielet and single secondary dielet, it can be extended to any number of secondary dielets to support scalable MCM designs.

In this example, wherever an MMU 110 sends bind information back to the access counter circuits 118, the access will store the bind information in an internal RAM. The access counter circuit 118 checks the VEID and based on that knows this is bind information including engine id, IBP, and aperture.

After binding is complete, when the access counter circuit 118 later receives a remote memory update with the same VEID based on the engine with that VEID generating a memory access request, the access counter can look up the corresponding bind information and use it to trigger a notification. If the corresponding counter has been incremented enough times to exceed a threshold, this indicates there is sufficient traffic for this absolute engine ID VEID to notify the software driver that the virtual memory page associated with the corresponding IBP is a candidate for page migration. The access counter circuit 118 will send the relative engine ID, the IBP, and the aperture to the software driver. The software driver can then migrate the corresponding page from the remote memory to the local memory.

Clear Counters

In addition to the above, example non-limiting embodiments provide a hardware mechanism for software to efficiently manage the access counter circuits (e.g., CLEAR one or all counters from any remote dielet). Example embodiments provide for software to clear the access counter circuits 118 (invalidate and reset the trackers) for several reasons (during boot time or after processing a notification/successful page migration). In the multi-dielet configuration, the hardware offers multiple ways to clear the access counter circuit 118: In example embodiments, the clear can come in 3 flavors.

1. Clear that targets all tags in all ACTR modules. (This is broadcast)
2. Clear that targets a specific tag (located on the local dielet. (This is not sent over dielet2dielet)
3. Clear that targets a specific tag located on a remote dielet. (This is forwarded to the necessary dielet).

Figure 9:
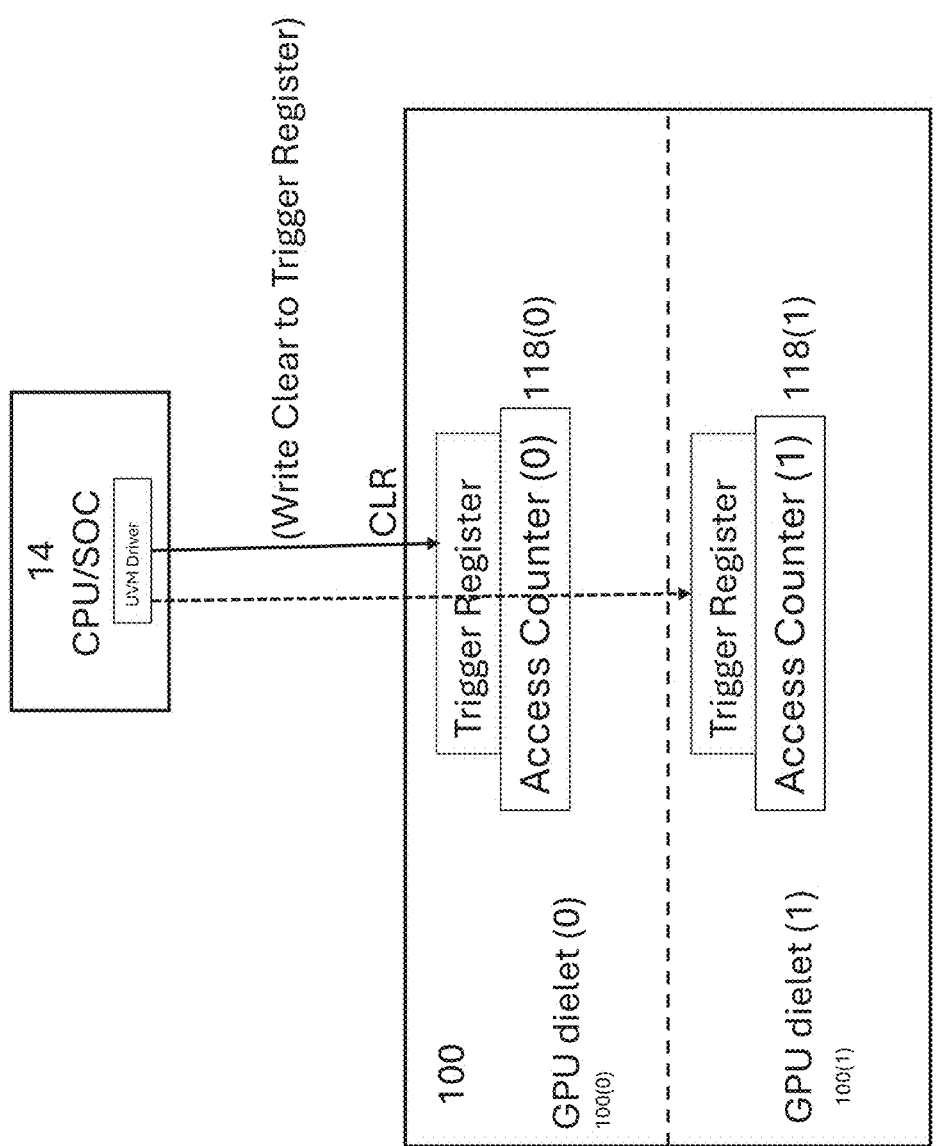
FIG. 9 shows an example HOST clear operation.

More specifically, CLEARs can be triggered via a software writable register(s). Given the notify buffers are now independent for each dielet, they have their own control register and the dielet information is visible to the software via the notification (based on the notify buffer that generated the notification). Therefore, software can choose to clear all trackers/counters in a dielet by writing the dielet's respective trigger register. See FIG. 9.

Software can use a HOST method (i.e., a method that consumes and produces host data on the SOC/CPU) to perform the CLEAR operation. HOST methods provide for control over the scope of the CLEAR operation and allow for either targeting all counters in the GPU (including counters located on all dielets), or targeting a specific counter regardless of which access counter module 118 it resides.

In example embodiments, the CLEAR could be issued though HOST methods to target all access counters in the system. For example, during GPU reset or prior to application teardown and context switch operations it may be desirable to clear all access counters to prevent unintended notifications. When an FBHUB 114 receives a method based CLEAR targeting all counters, the CLEAR is sent to local access counter module 118 and all other dielets' access counter modules as well. The dielet2dielet interconnect (CTC HBI) is used to broadcast this information.

In example embodiments, the CLEAR can also target only a specific tracker/counter 118 based on a tag (received from a prior notification) and can be issued to a dielet that didn't generate the notification. To solve this in example embodiments, the access counter module or circuit 118 (at dielet X that generated the notification) encodes the dielet_id in the notify_tag field of the original notification. This allows the access counter module or circuit 118 (at dielet Y that received the CLEAR operation) to look up the dielet_id from the tag (received with the CLEAR operation) and forward the CLEAR to the correct dielet (X in this example) via the dielet2dielet interconnect.

Multi-Instance GPU

With respect to the references above to "MIG", this acronym stands for NVIDIA's Multi-Instance GPU ("MIG") feature that allows a GPU to be securely partitioned into a number of separate GPU virtual instances, providing each of multiple tenants with their own dedicated GPU resources. MIG enables multiple GPU Instances to run in parallel on a single, physical GPU. See e.g., NVIDIA Multi-Instance GPU User Guide, docs.nvidia.com/datacenter/tesla/mig-user-guide/index.html (Nov. 17, 2022); US20230288471. To a GPU application, the instance it is running on "looks" like a complete GPU even though the instance is actually virtualized. This feature is particularly beneficial for workloads that do not fully saturate the GPU's compute capacity and therefore enable different tenants to run different workloads in parallel to maximize utilization of the GPU hardware. MIG ensures one tenant cannot impact the work or scheduling of other tenants, in addition to providing enhanced isolation for security purposes. Each instance's processors have separate and isolated paths through the entire memory system—the on-chip crossbar ports, L2 cache banks, memory controllers, and DRAM address busses are all assigned uniquely to an individual instance. This ensures that one tenant's workload can run with predictable throughput and experience predicable latencies, with the same L2 cache allocation and DRAM bandwidth, while another tenant's tasks are thrashing their own caches or saturating their DRAM interfaces. MIG can partition available GPU compute resources (including "GPC" clusters of processing cores such as streaming multiprocessors or SMs and other GPU engines such as copy engines or decoders), to provide a defined quality of service (QoS), with fault isolation for different applications such as virtual machines (VMs), containers or processes—so that one faulted process does not take down other processes.

Example Use Cases

The techniques disclosed herein may be incorporated in any processor that may be used for processing a neural network such as, for example, a central processing unit (CPU), a graphics processing unit (GPU), an intelligence processing unit (IPU), neural processing unit (NPU), tensor processing unit (TPU), neural network processor (NNP), a data processing unit (DPU), a vision processing unit (VPU), an application specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or to alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile device, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating from one spoken language to another, identifying and negating sounds in audio, detecting anomalies or defects during production of goods and services, surveillance of living and/or non-living things, medical diagnosis, decision making, and the like.

As an example, a processor incorporating the techniques disclosed herein can be employed to implement neural networks such as large language models (LLMs) to generate content (e.g., images, video, text, essays, audio, and the like), respond to user queries, solve problems in mathematical and other domains, and the like.

All patents, patent applications and publications cited herein are incorporated by reference for all purposes as if expressly set forth except that statements in any such incorporated-by-reference items that might be interpreted as disclaimers of subject matter shall not apply as disclaimers with respect to the subject matter herein unless such disclaimer is expressly stated and confirmed in this specification or in the written record of the prosecution history of this patent.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method comprising:
   communicating a memory binding to a first circuit on a first dielet and to a second circuit on at least one further dielet;
   then receiving a memory access request; and
   conditionally generating a page migration notification on the first dielet or the at least one further dielet based on associating the received memory access request with the previously communicated memory binding, when the received memory access request causes the first circuit and/or the second circuit to indicate memory access traffic above a threshold to a page associated with the communicated memory binding.

2. The method of claim 1 wherein the generating is performed by only one of the first circuit and the second circuit.

3. The method of claim 2 further including receiving a memory binding request and broadcasting a responsive memory binding acknowledgement to each of the first circuit on the first dielet and the second circuit on the at least one further dielet.

4. The method of claim 1 further comprising:
   tracking memory accesses and selectively generating notifications for use in memory page migration;
   wherein the first dielet and the at least one further dielet are disposed on a first multi-chip module, and the tracking tracks memory accesses originating from an engine disposed on another multi-chip module.

5. The method of claim 1 wherein generating generates the page migration notification to indicate there is sufficient traffic to migrate the page from a remote memory to a local memory.

6. The method of claim 1 further including:
   receiving a remote memory update with same virtual engine identifier (VEID) based on an engine with that VEID generating the memory access request,
   looking up the corresponding bind information, and
   using the corresponding bind information to trigger the page migration notification that a virtual memory page associated with a corresponding Instance-Block-Pointer (IBP) is a candidate for page migration.

7. The method of claim 6 wherein generating triggers the page migration notification upon an access counter being incremented enough times.

8. The method of claim 1 wherein the first circuit and the second circuit each monitor and log memory accesses.

9. The method of claim 1 wherein the first dielet and the at least one further dielet are part of a multi-chip module (MCM).

10. The method of claim 1 further including presenting the first dielet and the at least one further dielet as a single monolithic integrated unitary high performance processing system.

11. Apparatus comprising:

a first circuit disposed on a first dielet and configured to communicate a memory binding to the first dielet and to a further circuit disposed on a at least one further dielet;

a second circuit configured to receive a memory access request; and a third circuit configured to generate a page migration notification on the first dielet or the at least one further dielet based on associating the received memory access request with a previously communicated memory binding;

the third circuit further configured to conditionally generate the page migration notification when the received memory access request causes one of the first circuit and the further circuit to indicate memory access traffic above a threshold to a page associated with the communicated memory binding.

12. The apparatus of claim 11 wherein:

the third circuit generates the page migration notification on only one of the first dielet and the further dielet.

13. The apparatus of claim 12 wherein the first circuit is further configured to broadcast a memory binding acknowledgement responsive to a memory binding request, to each of the first circuit on the first dielet and the further circuit on the at least one further dielet.

14. The apparatus of claim 11 wherein the third circuit generates the page migration notification to indicate there is sufficient traffic to migrate the page from a remote memory to a local memory.

15. The apparatus of claim 11 wherein the third circuit comprises an access counter circuit configured to:

receive a remote memory update with a same virtual engine identifier (VEID) based on an engine with that VEID generating the memory access request, look up the corresponding bind information, and use the corresponding bind information to trigger the page migration notification that a virtual memory page associated with a corresponding Instance-Block-Pointer (IBP) is a candidate for page migration.

16. The apparatus of claim 15 wherein the access counter circuit triggers the page migration notification when it has been incremented enough times.

17. The apparatus of claim 11 wherein the second circuit is configured to monitor and log memory accesses.

18. The apparatus of claim 11 wherein the first dielet and the at least one further dielet are part of a multi-chip module (MCM).

19. The apparatus of claim 11 wherein the first dielet and the at least one further dielet are presented as a single monolithic integrated unitary high performance processing system.

* * * * *